May 26, 1936.  F. W. LYLE  2,042,234

ELECTRIC CONTROL SYSTEM

Original Filed Aug. 8, 1934

WITNESSES:
C. J. Weller.
Wm. C. Groome

INVENTOR
Frederick W. Lyle.
BY
O. H. Eschholz
ATTORNEY

Patented May 26, 1936

2,042,234

UNITED STATES PATENT OFFICE 2,042,234

ELECTRIC CONTROL SYSTEM

Frederick W. Lyle, Pittsburgh, Pa., assignor to Westinghouse Electric & Manufacturing Company, East Pittsburgh, Pa., a corporation of Pennsylvania Original application August 8, 1934, Serial No. 738,983. Divided and this application August 24, 1935, Serial No. 37,710

1 Claim. (Cl. 250—27)

My invention relates to voltage control systems and particularly to a system for controlling the phase of an alternating voltage applied between the control electrode and another electrode of an electrical discharge device.

This application is a division of application Serial No. 738,983, filed August 8, 1934.

Another object of my invention is to provide an arrangement for impressing between each a plurality of control electrodes and the cathode of a gaseous electrical discharge tube, fed from an alternating-current source, an alternating voltage which may be varied in phase at will.

A further object of my invention is to provide an arrangement for deriving from a source of constant periodic voltage a second voltage with a phase variable at will relative to said source.

A still further object of my invention is to provide a system for controlling the output current of a gaseous electrical discharge device fed from an alternating-current source.

It is possible to control the magnitude of current flow through an electrical discharge device, having an anode and a cathode, which is adapted to emit electrons or other electrically-charged entities and which is fed from a source of periodic electric current, by impressing between a control electrode and one of the principal electrodes of said device a voltage which is variable in phase relative to that of said source. However, not all impressed voltages thus variable are equally effective in their controlling action, and it has been found that the circuit networks illustrated in the drawings of this application, and about to be described, are particularly effective and dependable in performing such control functions. In particular, certain fields require means for impressing alternating potentials of variable phase upon a pair of control electrodes each controlling the current flow between an anode and the excited cathode of a gaseous electrical discharge tube having a plurality of anodes. It has been found that circuit networks comprising both resistance and reactance, proportioned relative to each other in the manner hereafter to be described and connected in the circuits illustrated in the appended drawing, afford a particularly effective means of supplying the control voltages to such controlled electrodes.

My invention will be better understood upon reading the following description of the appended drawing in which.

Figure 1:
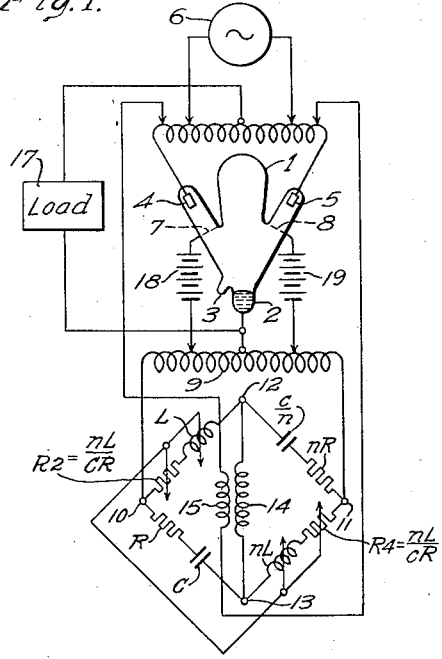
Figure 1 illustrates a circuit embodying the principles of my invention.

Referring to Fig. 1, an electrical discharge tube 1, which may comprise an evacuated container enclosing an electron-emissive cathode or a mercury cathode 2 excited by a side branch 3, and having main anodes 4, 5, is supplied by connections well-known in the art with alternating current from a source 6. The device 1 may be gas-filled or evacuated to any degree of vacuum and is provided with control electrodes 7, 8 of conventional form. The control electrodes 7, 8 are connected to an impedance 9 which spans the diagonally opposite corners 10, 11 of a four-armed network of the general Wheatstone bridge type. The cathode 2 is connected to an intermediate point, preferably the mid-point, of impedance 9. Between the other pair of diagonally opposite corners 12, 13 of this network is connected the secondary 14 of a transformer having a primary 15 supplied from the alternating current source 6. A load 17 is connected to the cathode 2 in a conventional manner or may be connected in series between source 6 and tube 1. Biasing sources 18, 19 may, if desired, be connected in the leads to the control electrodes 7, 8 to give them a desired potential, positive or negative, relative to the terminals 10, 11.

The four-sided network above mentioned comprises one pair of opposite arms containing a resistance and a capacitor in series with each other; that is to say, the opposite arms 10—13, and 12—11 contain, respectively, a resistor R and a capacitor C in series, and a resistor $nR$ and a capacitor $$\frac{C}{n}$$

The other pair of opposite arms of the network each comprises an inductance and a resistance serially connected; that is to say, the arm 10—12 comprises an inductance L and a resistance R2, and the arm 13—11 comprises an inductance $nL$ and a resistance R4.

I find that, when the respective impedances of the arms of the network above described are given such values that, with R, C and L chosen arbitrarily, (1) R2 is equal to $$\frac{L}{CR}$$

(2) $nR$ has a resistance which is $n$ times that of $R$, $n$ being any given number, (3)

$$\frac{C}{n}$$

has a capacity which is $$\frac{1}{n}$$

times that of $C$, (4) $nL$ has an inductance which is $n$ times that of $L$, and (5) $R4$ equals $$\frac{nL}{RC}$$

this network may be varied in the following manner to produce a particularly effective control on the electrodes 7, 8.

The preferred method of controlling the impedances in this network is as follows: The arms 13—11 and 10—12, comprising resistance and inductance in series, are made variable in such a way that the inductance and the resistance change proportionately to each other. A simple form for such an impedance is a resistance wire or continuous conductor wound on a magnetic core and provided with a contact-making slider terminal in the form well known in potentiometers. By moving such a slider, the resistance and inductance of the unit obviously change proportionately to each other.

Two impedances of the type just described, one having an ohmic value $n$ times the other, are connected to form the respective arms 13—11 and 10—12 of the above-described network, and their sliders are interconnected to move simultaneously, so that the ratio of these two impedances to each other remains constant while their absolute magnitudes vary. Assuming the transformer 14 connected so that terminal 12 is positive simultaneously with anode 5, a decrease of current through the discharge device 1 results when the sliders of the impedances just mentioned are moved to decrease their values; and vice versa.

Alternatively, or additionally, the impedances of the arms 10—13 and 12—11 may be made simultaneously variable, by means well known in the art, maintaining at all times the same ratio between resistance and capacity in the same arm, and between the resistances of opposite arms. When this is done, it is found that a decrease of impedance in these two arms causes an increase of current flow through the discharge device 1 if the potential of the transformer secondary 14 is of such polarity that the terminal 12 is positive at the same instant as the anode 5.

Figure 2:
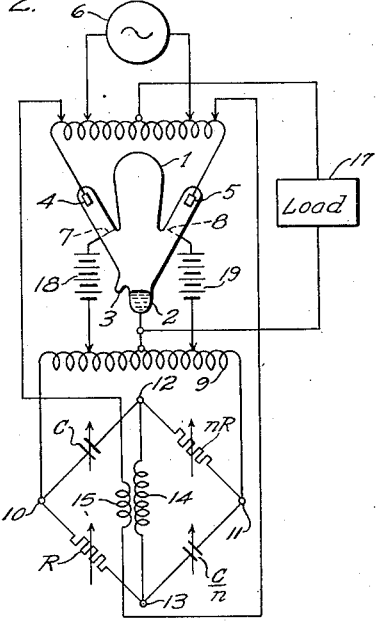
Fig. 2 illustrates a somewhat simplified circuit which has been found sufficiently effective to be satisfactory for many types of tube.

Referring to Fig. 2, a simplified form of network, which will be found satisfactory for many purposes, comprises an arm 10—13 consisting of a resistor $R$ and an arm 11—12 consisting of a resistor $nR$ having a value $n$ times as great. The other arms of network comprise a condensance $C$ in arms 10—12 and a condensance $$\frac{C}{n}$$

which is $$\frac{1}{n}$$

times as great in the arm 13—11. This network is controlled by varying the resistances $R$ and $nR$ while maintaining a constant ratio between their values. When this is done, a decrease of the resistance $R$ will be found to increase current flow through the discharge device 1, provided the polarity of the transformer secondary 14 is such that its terminal 12 is positive at the same instant in the alternating-current cycle as the anode 5.

Alternatively, the electrical discharge device 1 may be controlled by simultaneously varying the condensance $C$ and $$\frac{C}{n}$$

while maintaining a constant ratio between their values. When this is done, a decrease in current flow through the discharge device 1 will be found to result from a decrease in the value of $L$ with the transformer polarities as described in the preceding paragraph.

Condensances $C$ and $$\frac{C}{n}$$

may be replaced, respectively, by inductances $L$ and $nL$ to produce an alternative arrangement.

Figure 3:
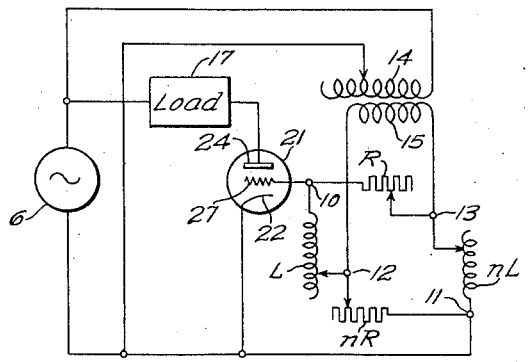
Fig. 3 illustrates a circuit of the general type of Fig. 2 applied to a single anode electrical discharge tube.

Fig. 3 shows a single-anode discharge tube 21 with cathode 22 and anode 24 connected across a source of current 6 in series with a load 17. A transformer 14—15 impresses voltage from source 6 across diagonally opposite terminals 12—13 of a bridge while the other diagonally opposite corners 10—11 of the bridge are connected between control-electrode 27 and cathode 2. Arm 10—13 of the bridge comprises a resistor $R$, arm 12—11 a resistor $nR$ which is $n$ times $R$ in magnitude; arm 10—12 comprises an inductance $L$ and arm 11—13 an inductance $nL$ always maintained $n$ times as great as $L$. The resistances $R$ and $nR$ may be simultaneously variable, or inductances $L$ may be simultaneously variable; or both.

While I have described my invention as applied to the control of current flow through an electrical discharge device, many other uses of its principle in controlling the phase of alternating-current voltages will be apparent to those skilled in the art. Thus, while I have described the terminals 12—13 as fed from source 6 through a transformer 14—15, other means of supplying them with energy from source 6 or any other source of the same frequency, such as impedances, may be used in suitable cases. Also, while I have described the primary 15, which energizes the four-sided network just described, as fed from the same source of periodic voltage as is the discharge device 1, the effectiveness of this network as a phase varying device is equally great when supplied by periodic voltages of a different frequency.

The resistances used in any of the above-described networks may, if desired, all be replaced by "negative resistances", i. e., devices giving a voltage proportional to instantaneous current but of such sign as to generate instead of absorb energy. Many such devices are known for example as series commutator generators.

Calculations will show that, with the above-described proportions existing between the various resistances, inductances and capacities in the arms of the network, the product of the resistances of any two adjacent arms, plus the product of their resistances, is equal to zero. It will also be found that the quotient of the resistances of any two opposite arms, minus the quotient of their reactances, is equal to zero. It will further be found that the quotient of the impedances of paths of opposite arms is the same.

It will be noted that by starting with zero impedance in one pair of opposite arms, say 10—12 and 11—13 of Fig. 1, and increasing to equality with the impedances in the other arms; then decreasing the latter proportionately until they are zero, the voltage across 10—11 varies in phase through 180 electrical degrees.

Figure 4:
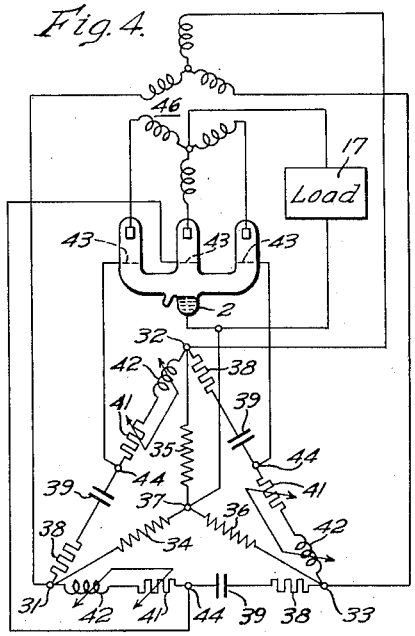
Figs. 4 and 5 show arrangements for polyphase systems.

It can be shown that the impedances above-described are of such types that, if an alternating-current flows through two adjacent arms in series, the voltage drops in the two arms are in quadrature with each other, and this is suitable for 180 degree maximum variation convenient for use on single phase systems. However, on polyphase systems it may be desirable to vary through smaller phase-angles; e. g., 120 electrical degrees for three-phase systems, 90 degrees for four-phase systems, etc. In such cases it may be desirable to employ networks in which the voltages generated in adjacent arms serially traversed correspond to the maximum angle through which phase-variation should be possible. Thus, in a three-phase system impedances producing voltage drop 120 degrees dephased, e. g., an inductance and resistance in one leg and a capacitance and resistance in the adjacent leg, the ratio of reactance to resistance in each case being as 1 to $$\sqrt{3}$$

could be used. In a four-phase system, similar elements with a ratio of reactance to resistance equal to tan 22½ degrees. Fig. 4 shows a three-phase arrangement 31, 32, 33 being terminals of a three-phase source with equal impedances 34, 35, 36 connected to star to form a neutral point 37. Across each line phase is connected a resistance 38 in series with a condenser 39 having a reactance equal to $$\frac{1}{\sqrt{3}}$$

times the value of resistor 38 in ohms. In series with the impedance just described is connected an impedance comprising resistance 41 and inductance 42 also related to ohmic value so that 42 is $$\frac{1}{\sqrt{3}}$$

times 41. The grid-electrode 43 of one section of a three-phase gas discharge tube is connected to the junction 44 between 39 and 41; and the cathode 2 of this tube is connected to neutral 37. The other grid electrodes are connected to similar impedances 38, 39, 41, 42 connected across terminals 32—33 and 33—31. By varying the impedance 41—42 maintaining proportionality between its resistance and reactance unaltered from zero to equality with 38, 39 and then varying 38—39 in similar proportionality until it reduces to zero, the phase of the voltage from 37 to 43 varies through 120 degrees. The impedances in phases 32—33 and 33—31 may be varied similarly, and simultaneously to vary the grid-electrode voltages thereof simultaneously with 43—37, thus controlling current flow in three-phase discharge tube.

For a four-phase arrangement a four-armed impedance would replace 34, 35, 36; and the phase difference between impedance section 38—39, and section 41—42 should be 135 degrees. In general, for a p-phase system a p-armed star-connected impedance would furnish neutral 37 and the phase difference of 38—39 from 41—42 should be $$\frac{180(p-1)}{p}$$

electrical degrees. Thus, if the resistance 38 and reactance on one side of junction 44 in each side of the p-sided polygon are called $r$ and $x$, respectively, the resistance 42 and resistance 41 on the other side of 44 in the polygon side should have a ratio of $$\frac{\left(x\cos\frac{180°}{p}+r\sin\frac{180°}{p}\right)}{r\cos\frac{180°}{p}-x\sin\frac{180°}{p}}$$

This relationship insures that, as in the case of Fig. 1, the grid voltage is varied in phase but not in magnitude. If $x$ (i. e. 39) is made zero, for example, the resistance 41 should maintain to the reactance 42 a ratio of $$\frac{r\sin\frac{180°}{p}}{r\cos\frac{180°}{p}}=\tan\frac{180°}{p}$$

It is obvious that while I have described electrode 2 as the cathode and electrodes 4, 5 and 34 as anodes, this relationship may be reversed, 2 being the anodes and 4, 5 or 34 being cathodes; or all electrodes may be electron-emissive acting alternatively as anodes or cathodes. It is likewise evident that a bridge of the Fig. 3 type may be provided to control each current-path in a system having a plurality of anode-to-cathode current paths, and that the phase of the voltage impressed upon terminals 12—13 may be varied from that impressed across the anode-to-cathode path of tube 1 by any known device; for instance by deriving it from terminals 10 and 11 of a similar concatenated with the one herein described.

Figure 5:
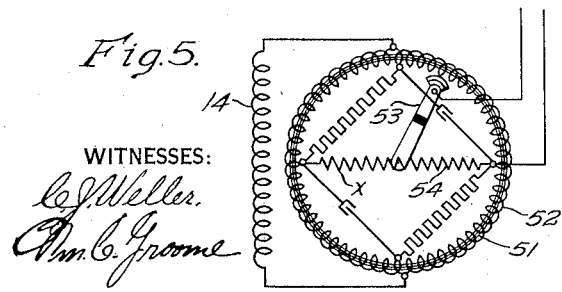

In Figure 5 a magnetic ring 51 is provided with a continuous uniformly distributed winding 52 with which a rotatable arm 53 makes sliding contact. Transformer 14 fed as in Fig. 1 connects to two diametrically opposite points on 52. Two equal resistances R and equal reactances X are tapped to face equally spaced points on winding 52, and an impedance 54 connects two diagonally opposite points on 52, its mid-point being tapped to the insulated pivot of arm 53. Two leads connected to said mid-point and to slider 53 serve to impress potentials between grid and cathode of a discharge device in the same way as the leads from terminals 10 and 11 in the other figure herein. Movement of slider 53 varies the phase of this potential relative to that of source 14. Alternatively, for polyphase systems, the $p$ phases of the alternating current source supplying the tube may be connected by transformers similar to 46 in Fig. 4 to $p$ equally spaced points on winding 52.

While I have described the principles of my invention as applied in a particular embodiment thereof, it will be realized that these principles are of broader application, as will be apparent to those skilled in the art. I, therefore, desire that the terms of the following claim shall be given the broadest interpretation of which it is reasonably susceptible.

I claim as my invention:

In combination with an alternating-current source, an electrical discharge device comprising an anode, a control electrode and a cathode, a four-armed network of the bridge type having one pair of diagonally opposite corners energized by alternating current by said source, and its other pair of diagonally opposite corners connected to impress a voltage between said control electrode and said cathode, one pair of opposite arms of said network each comprising a resistor, and the other pair of opposite arms of said network comprising an inductor, the product of the resistances of any two adjacent arms plus the product of their reactances being equal to zero, the quotient of the impedances of pairs of opposite arms being the same, and means to vary the impedances of a pair of opposite arms without varying the quotient of their impedances.

FREDERICK W. LYLE.